(12) United States Patent
Esser et al.

(10) Patent No.: US 11,964,821 B2
(45) Date of Patent: Apr. 23, 2024

(54) PROCESS BELT

(71) Applicant: GKD—Gebr. Kufferath AG, Duren (DE)

(72) Inventors: Frank Esser, Duren (DE); Alexander Pauly, Kreuzau (DE)

(73) Assignee: GKD - Gebr. KUFFERATH AG, Duren (DE)

( * ) Notice: Subject to any disclaimer, the term of this patent is extended or adjusted under 35 U.S.C. 154(b) by 62 days.

(21) Appl. No.: 17/951,825

(22) PCT Filed: Mar. 12, 2021

(86) PCT No.: PCT/DE2021/000047
§ 371 (c)(1),
(2) Date: Sep. 23, 2022

(87) PCT Pub. No.: WO2021/190680
PCT Pub. Date: Sep. 30, 2021

(65) Prior Publication Data
US 2023/0348193 A1 Nov. 2, 2023

(30) Foreign Application Priority Data

Mar. 27, 2020 (DE) .......................... 102020001958.7
Jul. 13, 2020 (DE) .......................... 102020004186.8

(51) Int. Cl.
*B65G 15/32* (2006.01)
(52) U.S. Cl.
CPC .................................... *B65G 15/32* (2013.01)
(58) Field of Classification Search
CPC ...................................................... B65G 15/32
(Continued)

(56) References Cited

U.S. PATENT DOCUMENTS 3,077,947 A * 2/1963 Peebles ................. E04B 1/8409
442/229
3,415,700 A * 12/1968 Webster ................. B65G 15/34
156/178

(Continued)

FOREIGN PATENT DOCUMENTS

CN 108790328 11/2018
DE 2621 706 A1 11/1977

(Continued)

OTHER PUBLICATIONS

PCT/DE2021/000047 International Search Report dated Jul. 12, 2021.

(Continued)

*Primary Examiner* — James R Bidwell
(74) *Attorney, Agent, or Firm* — Ralph E. Jocke; WALKER & JOCKE

(57) ABSTRACT

Apparatus comprising a process belt includes a woven rectangular planar structure with opposed longitudinal ends that are joined together to form an endless belt. The exemplary woven planar structure includes metal and glass warp fibers that extend in the longitudinal direction, and metal and/or glass weft fibers which extend transversely of the warp fibers. The diameter of the glass warp fibers is substantially greater than the diameter of the metal warp fibers which causes the outer surfaces of the glass fibers to extend outwardly of the metal warp fibers on the outer surface. This configuration causes items engaged with the outer surface to be operatively engaged with only the glass warp fibers. In exemplary arrangements a coating comprised of fluoropolymer extends on the fiber surfaces which comprise the entire outer surface of the planar structure and the belt.

20 Claims, 2 Drawing Sheets

(58) Field of Classification Search
USPC .................................................. 198/846, 847
See application file for complete search history.

(56) References Cited

U.S. PATENT DOCUMENTS

| | | | | |
|---|---|---|---|---|
| 3,612,256 | A | 10/1971 | Limbach | |
| 3,622,256 | A * | 11/1971 | Borisoglebsky | F04C 18/084 |
| | | | | 418/201.3 |
| 6,223,781 | B1 * | 5/2001 | Yamada | D03D 3/04 |
| | | | | 139/383 AA |
| 7,464,809 | B2 * | 12/2008 | Nozaki | B65G 15/34 |
| | | | | 198/500 |
| 2012/0289371 | A1 | 11/2012 | Schank | |
| 2013/0281579 | A1 * | 10/2013 | Nelson | B32B 27/322 |
| | | | | 525/200 |
| 2017/0275097 | A1 * | 9/2017 | Lewis | B65G 23/06 |

FOREIGN PATENT DOCUMENTS

| | | | |
|---|---|---|---|
| DE | 29 34 782 A1 | 3/1980 | |
| DE | 10337397 A1 | 11/2004 | |
| DE | 102016107811 A1 | 11/2017 | |
| FR | 950287 | 2/1964 | |
| JP | 56-144013 | 10/1981 | |
| WO | WO-9511847 A1 * | 5/1995 | ............. B65G 15/30 |
| WO | WO-2004037683 A2 * | 5/2004 | ............. B65G 15/32 |

OTHER PUBLICATIONS

PCT/DE2021/000047 International Preliminary Report on Patentability dated Jul. 12, 2021.

\* cited by examiner

PROCESS BELT

TECHNICAL FIELD

Exemplary arrangements relate to a process belt comprising a planar structure, which is formed as an endless belt comprising an inner and outer surface, wherein the outer surface has coated glass fibers.

BACKGROUND ART

Process belts are guided as endless belts over at least two deflection rollers and they have an inner side located radially on the inside and an outer surface located radially on the outside. Only the outer surface comes into contact with goods to be processed or treated. The goods to be treated should not be negatively impacted by the process belt. Process belts may benefit from improvements.

SUMMARY

To achieve a careful controlled contact between a process belt and goods to be treated, exemplary arrangements provide a coated glass fiber on the outer surface of the process belt. Woven fabrics, which have glass fibers in the longitudinal direction of the process belt and thus comprise the warp fibers that extend in the warp direction, may be used in exemplary arrangements. These exemplary glass fibers are integrated in the process belt in such a way that the goods to be treated which are engaged with the outer surface only come into operative contact with the coated outer surfaces of the glass fibers of the process belt.

In some belt arrangements the glass warp fibers can shift in the use of process belts. Adhesion of the glass fibers by means of a coating may be used but in some configurations may not completely eliminate a shifting of the glass fibers within the process belt.

Exemplary arrangements may comprise a process belt with glass fibers arranged in such a way that the belt does not change its properties even after longer use.

In some arrangements shifting of glass warp fibers may be minimized by having metal warp fibers that are arranged in the longitudinal direction.

In some exemplary arrangements fibers are monofilament or multifilament, wires or ropes, and they can be made of various materials or material combinations. The metal warp fibers arranged in the longitudinal direction of the exemplary process belt, reduce the risk that the glass fibers slip laterally. As a result the glass warp fibers are held firmly in the planar structure.

Process belts of exemplary arrangements are suitable in particular for driers and in particular for driers in the nonwoven industry. These process belts can be air-permeable, and glass fibers that are preferably coated with a fluoropolymer such as PTFE prevent an adhesion of the product to be treated on the process belt.

The metal fibers can be arranged diagonally to the process belt in the longitudinal direction of the process belt or also directly along the process belt. It can be useful when the metal warp fibers are arranged parallel to the glass warp fibers.

To ensure that the outer surface of the process belt is dominated by the glass fiber, in exemplary arrangements the metal warp fibers have a smaller diameter than the glass warp fibers.

The longitudinal direction of the process belt corresponds to the circumferential direction thereof, and the metal fibers can additionally also have metal weft fibers, which run transversely to the longitudinal direction of the process belt. In the case of a woven fabric, the weft fibers may include glass fibers, metal wires or ropes, for example.

So that it is ensured that the contact points with the product to be treated are only formed by the glass fibers, in exemplary arrangements the coated glass warp fibers form the contact points for products on the outer surface of the planar structure and the metal warp fibers remain disposed inward behind the outward surfaces of the glass warp fibers on the outer surface of the planar structure.

The planar structure is rectangular initially and generally shaped into an endless belt in that opposite longitudinal ends of a rectangular planar structure are connected to one another. This connecting point is referred to as a seam, a connection or a splice. The ends can be sewn together at the splice, for example. In order to establish a particularly secure stable connection, in some exemplary arrangements the planar structure may have a connection that extends transversely to the longitudinal direction, at which the metal warp fibers are welded together.

In some exemplary arrangements it may be advantageous when at least some of the metal warp fibers have an eyelet on at least one longitudinal end, in order to connect said metal fibers to their other end.

In exemplary arrangements the connecting seam does not leave behind any markings or imprints on the product to be treated. In exemplary arrangements the planar structure has a connection that extends transversely to the longitudinal direction, which is located inwardly behind the outer surfaces of the coated glass warp fibers of the planar structure in such a way that the process belt does not cause any imprints on the abutting product. For this purpose, in some exemplary arrangements the process belt may be less thick in the region of the connection than in the remaining regions.

In some exemplary arrangements it is useful to have metal warp fibers arranged so that a metal warp fiber is immediately transversely adjacent on both sides of a glass warp fiber. The metal warp fiber is thereby not integrated in the glass warp fiber, but the glass fiber is present as monofilament or multifilament as a separate strand, while a metal warp fiber is arranged immediately transversely adjacent on each transverse side of this glass fiber.

In some exemplary arrangements a metal warp fiber does not have to be arranged transversely between each individual warp glass fiber. A metal fiber can also be arranged transversely between several glass warp fibers, in which arrangements multiple glass warp fibers are immediately adjacent on each transverse side of a metal warp fiber. Such exemplary arrangements may prevent slipping of the several glass fibers and provide stability to the planar structure in the longitudinal direction.

In some exemplary arrangements at least some of the glass fibers are multifilament. A yarn or a rope, for example, can be provided as multifilament.

In some exemplary arrangements at least some of the metal fibers are wires.

In some exemplary arrangements the metal fibers may comprise magnetic or non-magnetic materials. In some arrangements the metal fibers may comprise both magnetic and non-magnetic fibers.

In some exemplary arrangements the planar structure may comprise a spiral woven fabric, or other woven fabric. In other arrangements the planer structure may comprise a non-woven fabric, or a knitted fabric.

In exemplary arrangements it is useful when the glass fiber forms a warp fiber of the woven fabric. In exemplary arrangements it is useful when the metal fiber also forms a warp fiber of the woven fabric.

In exemplary arrangements an anti-adhesion coating is provided on at least the outer surface. In exemplary arrangements the planar structure is coated with a coat of fluoropolymer over the entire surface. In exemplary arrangements the coating prevents the splicing of multifilament glass fibers and prevents adhesion of the process belt and the product in contact with the belt.

Exemplary arrangements include an endless belt that may be used as a process belt in drying plants, in which items supported on the outer surface of the belt are dried. In exemplary arrangements the planar structure has passages which are alternatively referred to as openings, which have a cumulative area that is more than 30% of the area of the belt surface. The exemplary process belt thus has openings transversely between the warp fibers and weft fibers of the process belt that enable air flow between the inner and outer surfaces of the process belt. In exemplary arrangements the cumulative area of the openings equal at least 30% of the outer surface area of the entire planar structure or of the process belt, respectively.

DETAILED DESCRIPTION

Figure 1:
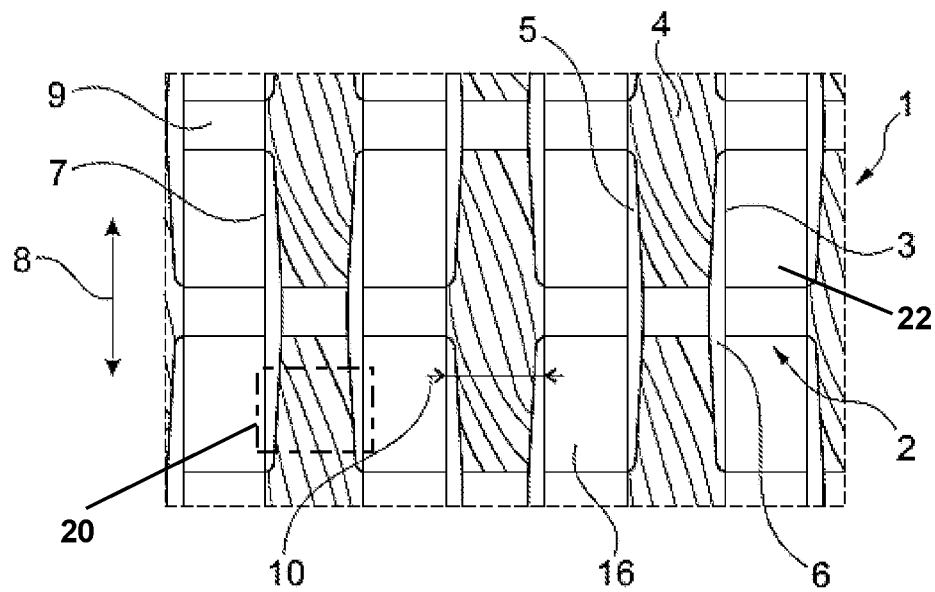
FIG. 1 shows a top view of a portion of a planar structure of a process belt in an exemplary arrangement.

An exemplary process belt 1 a portion of which is shown in FIG. 1, is a planar structure 2, which is formed as woven fabric 3. A glass warp fiber 4 forms a warp of the woven fabric 3 in this fabric 3, and a metal warp fiber 5, 6 is in each case likewise woven in as warp immediately laterally transversely adjacent to the glass warp fiber 4 on each transverse side.

A surface of this planar structure 2, which is located in the rear on the opposed side of the structure shown in FIG. 1, forms the inner surface (not shown) when using the planar structure as a process belt, and the surface shown in FIG. 1 forms the outer surface 18 of the planar structure and the endless process belt. The longitudinal direction 8 of the process belt 1 runs in the direction of the glass warp fibers. In exemplary arrangements the glass warp fibers 4 and the metal warp fibers 5, 6 in each case form a warp of the exemplary woven fabric. Transversely thereto, metal weft fibers comprised of wires 9 in each case form the weft of the exemplary woven fabric 3. Of course this approach is exemplary and in other arrangements glass or other types of weft fibers may be used.

FIG. 1 shows that each second glass warp fiber 4 is held on both transverse sides by immediately adjacent metal warp fibers which comprise wires 5, 6 in each case. In this arrangement the transverse direction is along the direction of a weft fiber 9. In the longitudinal direction of the glass warp fiber 4, the glass fiber is in each case held on both transverse sides by a transverse surface 7 of a metal wire 5, 6.

The metal warp fibers, which are formed as wires in the exemplary arrangement, thus run parallel to the glass warp fiber 4.

In the exemplary arrangement the metal warp fibers have a significantly smaller diameter than the glass warp fibers. In an exemplary arrangement the diameter of the metal warp fibers is less than one third of the diameter 10 of the glass warp fiber 5. The weft fibers which in the exemplary arrangement comprise wires 9 and comprise metal weft fibers, which run transversely to the longitudinal direction 8 of the process belt 1.

Due to the particular thickness of the glass warp fibers 4, the glass warp fibers 4 in the woven fabric 3 shown in FIG. 1 extend outward on the outer and inner surfaces that extend transversely in the weft direction across the entire planar structure 2 and the belt. The metal warp fibers 5, 6 remain disposed inward behind the outer surface of the glass warp fibers of the planar structure 2.

Figure 2:
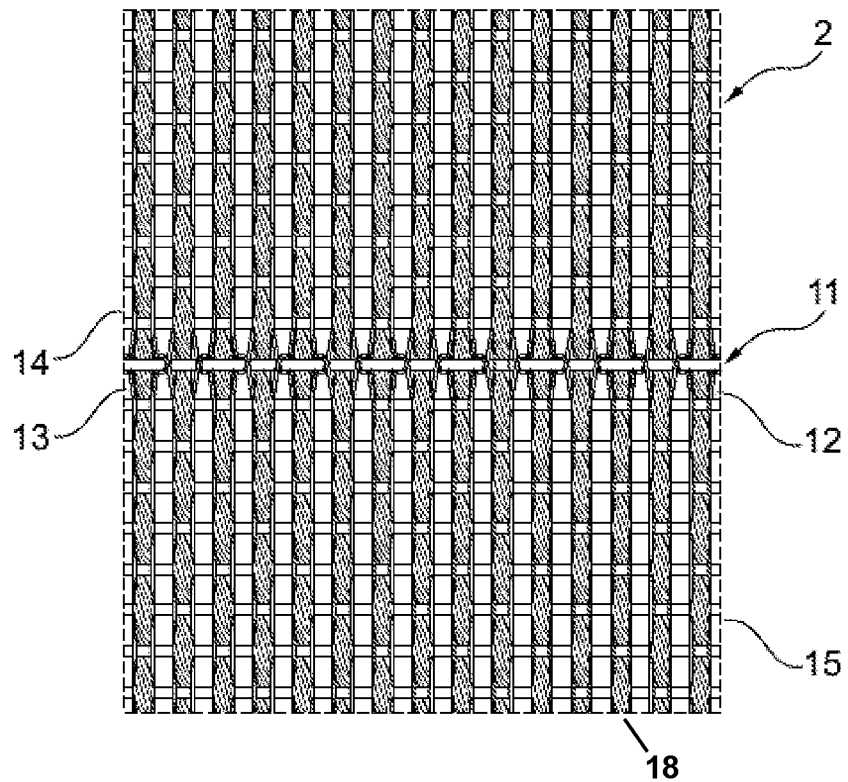
FIG. 2 shows a portion of the exemplary planar structure shown in FIG. 1 at the seam.
Figure 3:
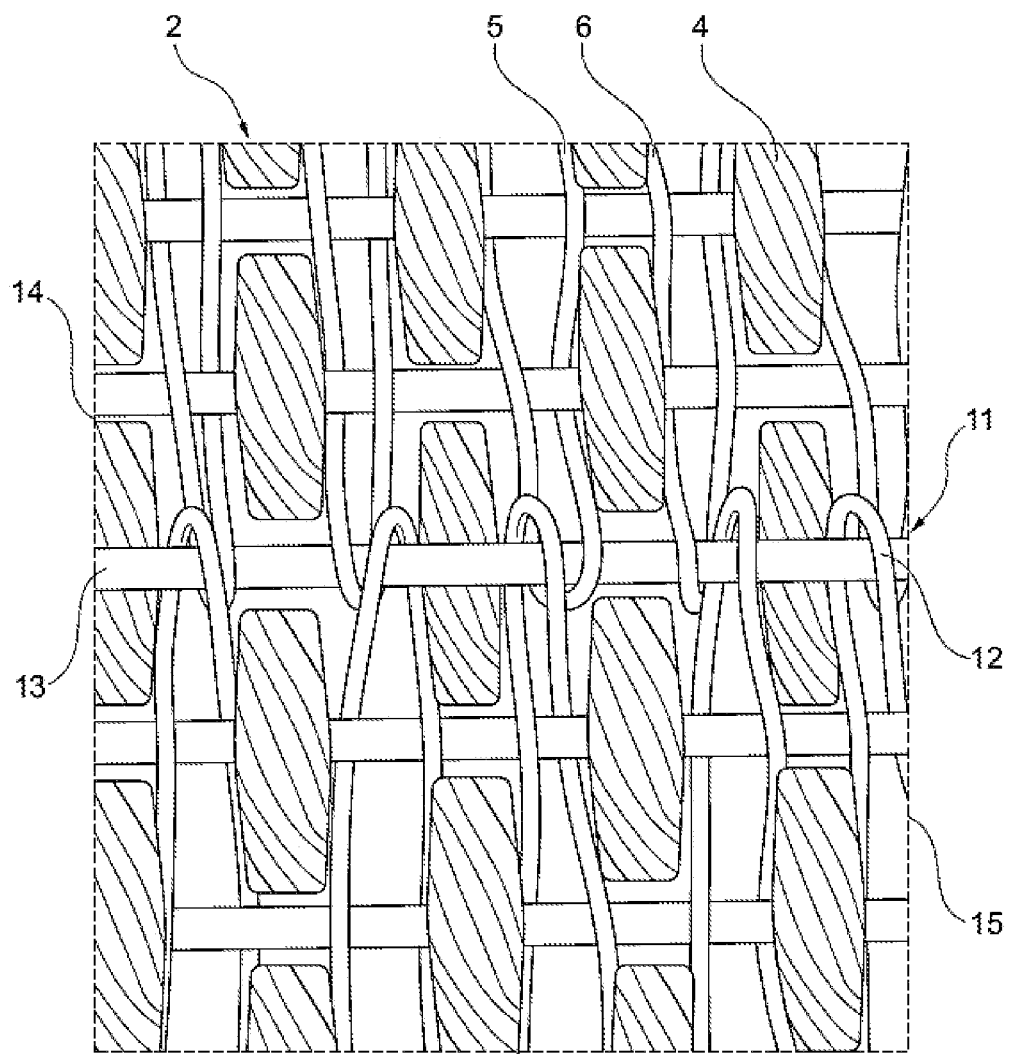
FIG. 3 shows an enlarged illustration of the portion shown in FIG. 2 in the region of the seam.

An exemplary connection 11 is shown in FIG. 2, on which the longitudinal ends of the metal warp fibers 5, 6 in each case have an eyelet 12. To form the eyelet 12, the end of the metal warp fiber 5, 6 is welded to itself. This results in a plurality of eyelets located next to one another, which are at one longitudinal end of the planar structure and at the other longitudinal end of the planar structure. In an exemplary arrangement a stable wire 13 extending through these eyelets runs in the transverse direction parallel to the weft fibers through the individual eyelets in order to connect the one longitudinal end 14 of the planar structure 2 to the other longitudinal end 15 of this planar structure. Such connection forms the endless belt.

In an exemplary arrangement instead of via the eyelets 12 and the metal wire 13, the ends of the metal warp fibers 5, 6 can be welded directly to one another at the connection, either by welding together eyelets or otherwise. The eyelets 12, however, allow for a revisable connection of the longitudinal ends 14 and 15 of the planar structure 2.

In exemplary arrangements the connection is additionally formed so that the connected metal warp fibers are located inwardly behind the outer surfaces of the glass warp fibers 4 on the outer surface 18 of the planar structure 2. The process belt 1 of this exemplary configuration does not cause any imprints on the abutting product (not shown) that is in contacting engagement therewith.

In some exemplary arrangements, the metal fibers may be comprised of monofilament wires, while the glass fibers may be comprised as multifilament such as slightly wound glass fiber strand.

In exemplary arrangements the planar structure 2 is coated with a coating (schematically partially referred as 20) comprised of fluoropolymer over the fibers of the entire surface. This includes in the exemplary arrangement the fibers of the entire outer surface, the fibers of the entire inner surface and the fiber surfaces that bound passages that extend through the planar structure between the inner and outer surfaces. Of course this approach is exemplary.

The loose formation of the woven fabric 3 in the exemplary arrangements with the larger spaces 16 between the warp and weft fibers has the result that the planar structure 2 has a plurality of passages 22 that extend between the inner and outer surfaces. In exemplary arrangements the passages have a cumulative area of at least 30% of the area of the outer surface. In the exemplary arrangement shown in the Figures, the cumulative area of the passages provide a cumulative free passage area of almost 50% of the area of the entire outer surface. The exemplary planar structure may be well suited as an endless belt for drying products, such as in particular in the nonwoven industry.

Nonwovens are known to those skilled in the art to be sheet or web structures bonded together by entangling fiber or filaments (and by perforating films) mechanically, thermally or chemically and are described on the website of the International Nonwovens and Disposables Association which is found at www.inda.org.

Thus the exemplary arrangements achieve improved operation, eliminate difficulties encountered in the use of prior arrangements and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful concepts and features are not limited to the exact features that have been shown and described.

Having described features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

The invention claimed is:

1. Apparatus comprising:
   a process belt comprised of a woven rectangular planar structure with opposed longitudinal ends that are joined together to form an endless belt which includes an inner surface and outer surface,
   wherein the woven planar structure includes
     metal and glass warp fibers which extend in parallel and in the longitudinal direction,
     metal or glass weft fibers which extend transversely of the warp fibers,
     wherein the glass warp fibers have a larger diameter than the metal warp fibers such that the glass warp fibers extend transversely outward beyond the metal fibers on the outer surface,
     a coating comprised of fluoropolymer, wherein the coating extends on the entire outer surface,
   a plurality of passages that extend through the planar structure, wherein the passages extend between the inner surface and the outer surface and occupy at least 30% of the area of the outer surface.

2. The apparatus according to claim 1
   wherein the weft fibers comprise metal fibers that extend transversely to the longitudinal direction.

3. The apparatus according to claim 1
   wherein the longitudinal ends of the planar structure are joined together at a connection that extends transversely to the longitudinal direction,
   wherein at least some metal warp fibers are welded together at the connection.

4. The apparatus according to claim 1
   wherein at least some of the metal warp fibers include an eyelet at an end thereof.

5. The apparatus according to claim 1
   wherein the longitudinal ends of the planar structure are joined together at a connection that extends transversely to the longitudinal direction,
   wherein the connection is disposed inwardly away from the outer surface toward the inner surface,
   whereby the connection does not cause any imprints on a product in abutting connection with the outer surface.

6. The apparatus according to claim 1
   wherein each glass warp fiber has a metal warp fiber disposed immediately adjacent thereto on each transverse side.

7. The apparatus according to claim 1
   wherein each metal warp fiber has immediately adjacent thereto on each transverse side, at least two immediately adjacent glass warp fibers.

8. The apparatus according to claim 1
   wherein at least some of the glass warp fibers are multifilament.

9. The apparatus according to claim 1
   wherein at least some of the metal warp fibers are comprised of wires.

10. The apparatus according to claim 1
    wherein the metal warp fibers are comprised of magnetic fibers and nonmagnetic fibers.

11. The apparatus according to claim 1
    wherein the coating extends on the entirety of the outer surface and each passage bounding surface.

12. Apparatus comprising:
    a process belt comprised of woven warp and weft fibers,
    wherein the warp fibers include metal and glass warp fibers, wherein the glass warp fibers are configured to extend outwardly beyond the metal warp fibers on an outer surface of the belt,
    wherein the weft fibers extend transversely to the warp fibers and comprise at least one of glass weft fibers and metal weft fibers,
    wherein a plurality of passages extend through the belt intermediate of the warp fibers and the weft fibers, wherein the passages cumulatively occupy at least 30% of an area of the outer surface,
    a coating comprised of fluoropolymer, wherein the coating extends on the fibers which comprise the entire outer surface.

13. The apparatus according to claim 12
    wherein the glass warp fibers have a larger diameter than the metal warp fibers,
    whereby on the outer surface of the belt, outer surfaces of the glass fibers extend outwardly beyond all outer surfaces of the metal fibers.

14. The apparatus according to claim 13
    wherein the process belt comprises a rectangular planar structure with opposed longitudinal ends that are joined together to form an endless belt that includes the outer surface and an inner surface.

15. The apparatus according to claim 14
    wherein the metal warp fibers at the longitudinal ends are joined together at a splice,
    wherein at the splice the outer surfaces of the joined metal fibers are positioned inwardly toward the inner surface and away from the outer surfaces of the glass fibers.

16. The apparatus according to claim 15
    wherein each glass warp fiber has a metal warp fiber disposed immediately adjacent thereto on each transverse side.

17. The apparatus according to claim 15
    wherein each metal warp fiber has immediately adjacent thereto on each transverse side, at least two immediately adjacent glass warp fibers.

18. The apparatus according to claim 15
    wherein each passage is bounded by at least one passage bounding surface,
    wherein the coating extends intermediate of the inner surface and the outer surface on each passage bounding surface.

19. The apparatus according to claim 18
    wherein the coating extends on fibers which comprise the entire inner surface.

20. Apparatus comprising:
a continuous process belt comprised of woven warp and weft fibers,
wherein the warp fibers include glass warp fibers having a first diameter and metal warp fibers having a second diameter, wherein the first diameter is greater than the second diameter such that the glass warp fibers extend outwardly beyond the metal warp fibers on an outer surface of the belt,
wherein the weft fibers extend transversely to the warp fibers and comprise at least one of metal weft fibers and glass weft fibers,
wherein a plurality of passages extend through the belt between the warp and weft fibers,
wherein the passages occupy a cumulative area that is at least 30% of an area of the outer surface of the belt,
a coating comprised of fluoropolymer, wherein the coating extends on fiber surfaces which comprise the entire outer surface of the belt.

* * * * *